United States Patent

[11] 3,574,275

| [72] | Inventor | Marvin A. Staschke |
| | | Glendora, Calif. |
| [21] | Appl. No. | 860,594 |
| [22] | Filed | Sept. 24, 1969 |
| [45] | Patented | Apr. 13, 1971 |
| [73] | Assignee | Thermal Hydraulics Corporation |
| | | Glendora, Calif. |

[54] THERMALLY ACTUATED MOTOR WITH AUTOMATICALLY RETURNABLE SHAFT
12 Claims, 3 Drawing Figs.

[52] U.S. Cl. ............................................ 60/23,
73/363, 236/100
[51] Int. Cl. ....................................... F01k 27/00
[50] Field of Search ........................................... 60/23, 9; -
73/(Inquired), 362.1, 363; 236/68, 100, (Inquired);
251/11; 92/90

[56] References Cited
UNITED STATES PATENTS

| 2,881,616 | 4/1959 | Clifford et al. | 236/100 |
| 2,928,233 | 3/1960 | Kimm | 60/23 |
| 3,149,455 | 9/1964 | Daly et al. | 236/100X |
| 3,330,480 | 7/1967 | Drapeau et al. | 236/100 |
| 3,386,065 | 5/1968 | Algino | 337/315 |
| 3,213,606 | 10/1965 | Martin et al. | 60/23 |

*Primary Examiner*—Martin P. Schwadron
*Assistant Examiner*—Allen M. Ostrager
*Attorney*—Bertha L. MacGregor ABSTRACT: A thermally actuated motor provided with an axially reciprocable, automatically returnable shaft, comprising a differential diameter shaft having a radially extending flange between its larger and smaller diameter members, and a rubber sleeve surrounding each of said shaft members and bearing on opposite sides of the flange between said flange and end walls of a housing which contains the shaft, a heating element and expansible material. Pressure of the expansible heated material on the shaft through the rubber sleeves causes movement of the shaft in one direction, and withdrawal of pressure due to cooling of the expansible material automatically causes movement of the shaft in the opposite direction. The rubber sleeves also serve as seals to prevent loss of expansible material from the housing.

PATENTED APR 13 1971

3,574,275

INVENTOR.
MARVIN A. STASCHKE
BY
Bertha L. MacGregor
ATTORNEY

THERMALLY ACTUATED MOTOR WITH AUTOMATICALLY RETURNABLE SHAFT

This invention relates to a thermally actuated motor with an axially reciprocable automatically returnable shaft. In the embodiment shown and described herein, the motor functions as a pull motor, but obviously opposite ends of the shaft can impart push and pull forces, respectively, on other mechanism.

The main object of the invention is to provide an exceedingly simple and efficient thermally actuated motor in which heated expansible material enclosed in a high-pressure casing exerts pressure against a differential diameter flanged shaft through resilient sleeves surrounding the shaft on opposite sides of the flange, thereby compressing one sleeve in axial direction and stretching the other sleeve in axial direction, and causing the motor shaft to move in one direction. Cooling and contraction of the expansible material, when application of heat is terminated, causes the compressed rubber sleeve to expand to its normal assembled length and the stretched sleeve to become compressed axially, thereby automatically causing the shaft to move in the opposite direction.

The resilient sleeves function to serve as seals to prevent loss of expansible compound from the casing as well as to impart motion to the shaft.

Figure 1:
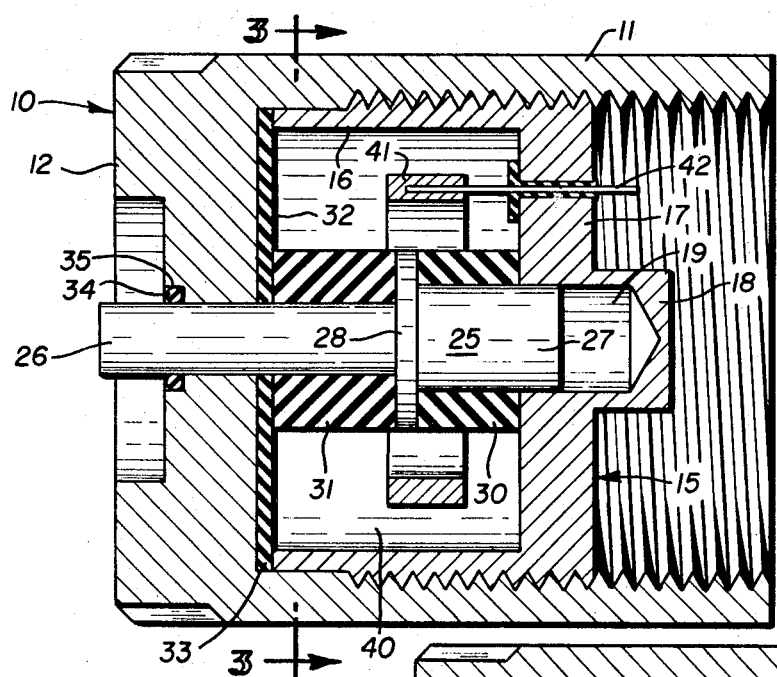
FIG. 1 is a vertical sectional view, on an enlarged scale, of a thermally actuated motor embodying my invention, showing the shaft in elevation, in its unactuated position.

In the embodiment of the invention shown in the drawings, a main housing 10 comprises a cylindrical sidewall 11 integral with an end wall 12. An inner casing 15 comprises a cylindrical sidewall 16 integral with an end wall 17. The contacting sidewalls 11 and 16 are threaded for convenient assembly of the housing 10 and casing 15. The end wall 17 of the casing may be provided with an axial extension 18 to provide a recess 19, as shown, or the extension 18 may be omitted and an opening provided in the end wall 17 for access to a shaft about to be described.

A differential diameter shaft 25 comprises a smaller diameter portion 26, a larger diameter portion with 27, and a flange 28 between the two members 26, 27. The flange 28 extends radially beyond the circumference of the shaft member 27, and preferably is integral with both members 26, 27. The shaft is mounted in the housing 10 and casing 15 with the smaller diameter member 26 extending through the end wall 12 and the larger diameter member 27 extending into the space 19 in the end wall 17. As stated, the casing extension 18 may be eliminated to expose the end of the shaft 27.

A rubber sleeve 30 surrounds the shaft member 27 adjacent one side of the flange 28 and extends longitudinally axially of the shaft between the flange 28 and the inner surface of the end wall 17 of the casing. The radial thickness of the rubber sleeve 30 is equal to the radial dimension of the flange surface 28 on which the sleeve 30 bears. A sleeve 31 surrounds the shaft member 26 adjacent the opposite side of the flange 28 and extends longitudinally axially of the shaft between the flange 28 and the inner surface of the end wall 12 of the housing. The radial thickness of the rubber sleeve 31 on shaft member 26 is equal to the radial dimension of the flange surface on which the sleeve 31 bears. Due to the differences in diameters of the shaft members 26 and 27, the rubber sleeve 31 is radially thicker or wider than the sleeve 30. Preferably the rubber of sleeve 30 is harder, that is, higher durometer rubber than the sleeve 31, in order to ensure a sufficient return force, as will be explained hereinafter, but if desired both sleeves 30 and 31 can be of the same durometer rubber. As shown, the sleeve 31 is integral with a radially extending disc seal 32 which bears on the inner surface of the housing end wall 12 and has its peripheral edge 33 clamped between the end edge of the casing wall 16 and the housing end wall 12.

The shaft member 26 is sealed adjacent its free end by a resilient O-ring 34 in groove 35 in the housing wall 12.

The space within the casing 15 provides a pressure chamber 40 containing expansible material, of which wax is an example. The expansible material is heated by a resistive electrical heating element 41 connected by electrodes 42 to a source of electrical energy (not shown).

Electrical energy is supplied to the electrodes 42 connected to the heating element 41, causing the expansible material to increase in volume and to exert pressure against the shaft 25 through the rubber sleeves 30, 31. The shaft 25 is caused to move toward the space 19 to assume the position shown in FIG. 2 due to the differential pressure applied to the shaft 25 through the sleeves 30, 31. The pressure functions to compress the sleeve 30 in axial direction and to stretch or elongate the rubber sleeve 31 in axial direction, as the shaft 25 is forced to move from the position shown in FIG. 1 to that of FIG. 2. This movement can be used to open orifices and to exert pulling force for various purposes on mechanism (not shown) operatively connected to the smaller diameter member 26 of the shaft 25. The larger diameter member 27 of the shaft 25 may be employed to exert pushing force if exposed in the space 19 by elimination of the casing extension 18.

Figure 2:
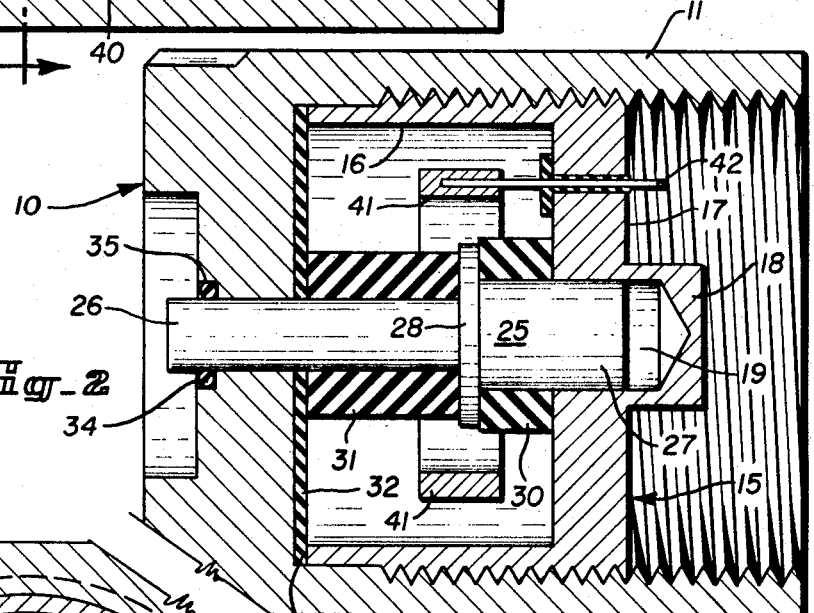
FIG. 2 is a view similar to FIG. 1, showing the shaft and other parts in the positions they assume when actuated by the heated expansible material to function as a pull motor.
Figure 3:
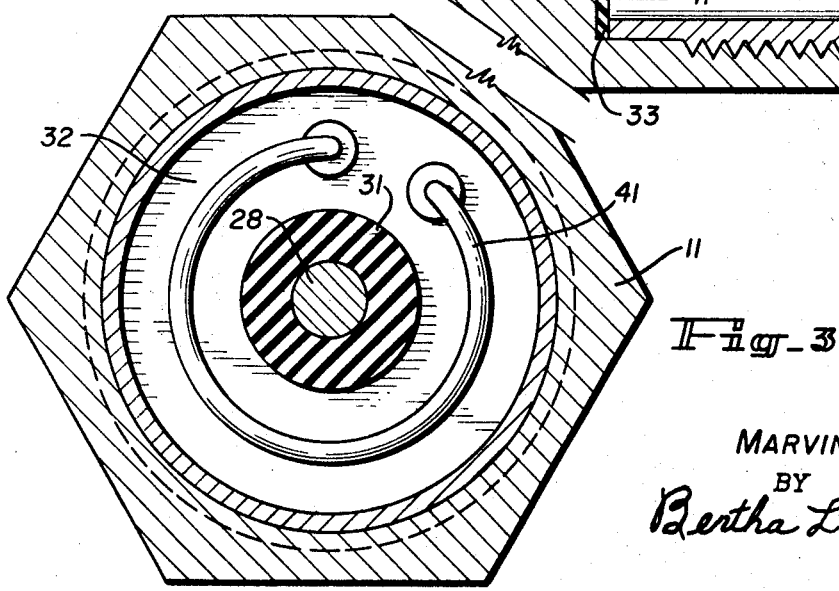
FIG. 3 is a transverse sectional view in the plane of the line 3—3 of FIG. 1.

The compound in chamber 40 cools upon termination of heat application and contracts, allowing the compressed rubber sleeve 30 to expand to its normal assembled length and compressing the sleeve 31, to force the shaft 25 to return automatically to predetermined normal position of FIG. 1 without the aid of a spring or other means such as heretofore employed to cause return movement of the shaft in thermal motors. The rubber sleeves 30 and 31, bearing on opposite sides to the flange 28 of shaft 25, are axially longer in their natural preassembled form than in their assembled condition, thus producing a constant pressure at the sealing surfaces between the seal 32, rubber sleeve 31 and flange 28, and between flange 28, rubber sleeve 30 and casing 15. Rubber sleeves 30, 31, also act as seals to prevent loss of expansible compound, which does not come into contact with any portions of the shaft 25 that enter into or exit from the chamber 40.

Substantial advantages are obtained by the employment of rubber sleeves 30 and 31 for the combined functions of actuating the shaft 25 in one direction, automatically returning the shaft by movement in the opposite direction, and sealing the compound in chamber 40, without the aid of springs or diaphragmlike means and separate seals such as heretofore employed for producing return movement of the shaft and confinement of the expansible material in the motor housing.

I claim:

1. A thermally actuated motor with automatically returnable shaft comprising:
   a. a pressure withstanding housing having a chamber containing heat-responsive expansible material;
   b. a differential diameter shaft having a larger and a smaller diameter member, axially reciprocable in the chamber;
   c. a flange extending radially from the shaft between the larger and smaller diameter members;
   d. resilient means in pressure receiving contact with the expansible material in the chamber engaging each of said shaft members to bear on opposite sides of the flange and on housing walls in the chamber and exerting differential pressure on said shaft when subjected to pressure of heated expansible material to move the shaft axially in one direction, said shaft automatically moving in the opposite direction when pressure on the resilient means is withdrawn due to cooling of the expansible material; and
   e. means for heating the expansible material.

2. The motor defined by claim 1, in which the resilient means are sleeves which surround the differential diameter members of the shaft.

3. The motor defined by claim 1, in which the resilient means are rubber sleeves which surround the differential diameter members of the shaft and have endwise contact with the flange.

4. The motor defined by claim 1, in which the resilient means are sleeves made of rubber of different durometer readings.

5. The motor defined by claim 1, in which the shaft has an end which extends through an opening in the housing end wall, and which functions as a pull motor when actuated.

6. The motor defined by claim 1, in which the housing comprises an outer housing member having an internally threaded cylindrical sidewall and integral end wall, and an inner casing member having an externally threaded cylindrical sidewall and an integral end wall, the threaded walls engaging each other and the end walls constituting opposite ends of the housing.

7. The motor defined by claim 6, in which the resilient means on one of the shaft members includes a disclike flange bearing on the housing end wall and having its peripheral edge clamped between the end of the casing sidewall and the housing end wall to form a seal preventing loss of expansible material from the chamber.

8. The motor defined by claim 6, in which the resilient means on the shaft members exert pressure against the shaft flange and against the respective end walls of the casing and housing to provide seals which prevent loss of expansible material from the chamber.

9. The motor defined by claim 2, in which the resilient sleeves are under pressure in axial directions when assembled with the shaft in the motor chamber.

10. A thermally actuated motor with automatically returnable shaft comprising:
  a. a pressure withstanding housing having a chamber containing expansible material;
  b. a differential diameter shaft axially reciprocable in the chamber having larger and smaller diameter members;
  c. a flange extending radially from the shaft between the larger and smaller diameter members of the shaft;
  d. resilient means in pressure receiving contact with the expansible material engaging each of said shaft members to bear on opposite sides of the flange and on a housing wall; and
  e. means for causing expansion of the expansible material and thereby exerting differential pressure on the shaft through the resilient means to move the shaft in one direction, contraction of the expansible material automatically causing withdrawal of pressure on the shaft through the resilient means and movement of the shaft in the opposite direction.

11. The motor defined by claim 10, in which the resilient means on the shaft members are rubber sleeves differing from each other in radial width and differing from each other in their response to pressure exerted by the expansible material.

12. The motor defined by claim 11, in which the rubber sleeves have different durometer readings.